US008806869B2

(12) United States Patent
Petrovic

(10) Patent No.: US 8,806,869 B2
(45) Date of Patent: Aug. 19, 2014

(54) METHOD FOR CONTROLLING A TURBOCHARGER SYSTEM OF AN INTERNAL COMBUSTION ENGINE, AND TURBOCHARGER SYSTEM

(75) Inventor: Simon Petrovic, Burtscheid Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 395 days.

(21) Appl. No.: 13/225,232

(22) Filed: Sep. 2, 2011

(65) Prior Publication Data

US 2012/0055152 A1 Mar. 8, 2012

(30) Foreign Application Priority Data

Sep. 7, 2010 (DE) .......................... 10 2010 037 368

(51) Int. Cl.
*F02B 33/44* (2006.01)
*F02B 33/00* (2006.01)
*F02B 37/013* (2006.01)
*F02B 37/12* (2006.01)
*F02B 37/00* (2006.01)
*F02B 37/18* (2006.01)

(52) U.S. Cl.
CPC .............. *F02B 37/18* (2013.01); *Y02T 10/144* (2013.01); *F02B 37/004* (2013.01); *F02B 37/001* (2013.01); *F02B 37/013* (2013.01)
USPC ................................ 60/612; 60/602; 123/562

(58) Field of Classification Search
CPC ........ F02B 37/013; F02B 37/18; F02B 37/00; F02B 37/001; F02B 37/004; Y02T 10/144
USPC ...................................... 60/612, 602; 123/562
IPC ................................ F02B 37/013,37/18, 37/12
See application file for complete search history.

(56) References Cited

U.S. PATENT DOCUMENTS 5,063,744 A * 11/1991 Ishiyama et al. ................ 60/612
5,408,979 A * 4/1995 Backlund et al. ............... 60/612
6,112,523 A * 9/2000 Kamo et al. .................... 60/612

(Continued)

FOREIGN PATENT DOCUMENTS

DE     10144663 A1 * 4/2003 ............ F02B 37/013
DE 102004051486 A1 * 1/2006 .............. F02B 37/12

(Continued)

OTHER PUBLICATIONS

The fully certified English translation Cornel Ehrhard (Pub. No. DE 10 2004 051 486 A1), published on Jan. 26, 2006.*
The fully certified English translation Erik Schindler et al. (Pub. No. DE 101 44 663 A1), published on Apr. 3, 2003.*

*Primary Examiner* — Thai Ba Trieu
(74) *Attorney, Agent, or Firm* — Julia Voutyras; Alleman Hall McCoy Russell & Tuttle LLP

(57) ABSTRACT

The disclosure relates to a method for controlling a turbocharger system of an internal combustion engine. The method comprises controlling a first bypass valve of a high pressure exhaust gas turbine and a second bypass valve of a low pressure gas turbine on the basis of a turbine model, the first and second bypass valves continuously variable. In this way, turbocharger system efficiency may be maximized.

18 Claims, 3 Drawing Sheets

(56) References Cited

U.S. PATENT DOCUMENTS

| | | | |
|---|---|---|---|
| 7,461,508 B2 * | 12/2008 | Rosin et al. | 60/612 |
| 8,276,378 B2 * | 10/2012 | Song et al. | 60/612 |
| 8,429,912 B2 * | 4/2013 | Guggenberger et al. | 60/612 |
| 8,459,025 B2 * | 6/2013 | Schwarte | 60/602 |
| 2006/0070381 A1 * | 4/2006 | Parlow et al. | 60/612 |
| 2006/0137636 A1 | 6/2006 | Oshita et al. | |
| 2009/0293476 A1 * | 12/2009 | Evans | 60/612 |

FOREIGN PATENT DOCUMENTS

| | | | | |
|---|---|---|---|---|
| DE | 102005025885 A1 * | 12/2006 | | F02B 37/013 |
| EP | 1387058 A2 * | 2/2004 | | F02B 37/013 |
| EP | 1519017 A1 * | 3/2005 | | F02B 37/013 |
| EP | 1728989 A1 * | 12/2006 | | F02B 37/013 |

* cited by examiner

METHOD FOR CONTROLLING A TURBOCHARGER SYSTEM OF AN INTERNAL COMBUSTION ENGINE, AND TURBOCHARGER SYSTEM

RELATED APPLICATIONS

This application claims priority to German Patent Application No. 102010037368.0, filed on Sep. 7, 2010, the entire contents of which being incorporated herein by reference.

FIELD

The disclosure relates to a method for controlling a turbocharger system of an internal combustion engine, and to a turbocharger system.

BACKGROUND AND SUMMARY

Internal combustion engines, in particular diesel and spark-ignition engines, are increasingly provided with turbochargers. A turbocharger serves to compress the air supplied to the engine, whereby an increase in power can be achieved. Conversely, a predefined power output can be achieved by a turbocharged engine of smaller cubic capacity, whereby a smaller and lighter construction and more fuel-saving propulsion can be attained.

Turbochargers of this type are generally driven by the exhaust gas flow of the internal combustion engine. For this purpose the turbocharger has a turbine arranged in the exhaust gas flow. The turbocharger drives, in particular via a common shaft, a compressor which compresses the charge air of the engine.

When two turbochargers are used with an internal combustion engine, the two turbines may be arranged, in particular successively, in the exhaust gas flow of the internal combustion engine, so that one of the two turbines works in a region of relatively high pressure and it is referred to as the high pressure turbine while the other turbine works in a region of relatively low pressure and is referred to as the low pressure turbine. Likewise, the two compressors may be arranged successively in the charge air flow, so that a compressor which can be driven by the high pressure turbine works in the region of relatively high pressure and is referred to as the high pressure compressor, while the other compressor, which can be driven by the low pressure turbine, is connected upstream of the high pressure compressor and is referred to as the low pressure compressor.

By using a plurality of turbochargers with an internal combustion engine it is possible to achieve improved throttle response together with higher specific power, especially because the high pressure turbine, which is usually constructed smaller, responds more quickly. On the other hand, the low pressure turbine is used to attain maximum power. In addition, a turbocharger system with a plurality of turbochargers offers advantages with an exhaust gas recirculation system, since the high pressure turbine generates higher exhaust gas back pressure, making possible increased exhaust gas recirculation.

In order to control the turbines and therefore the charge pressure, bypass valves arranged in a branch of the exhaust system parallel to the respective turbine are provided, making it possible to bypass the turbine concerned. If a bypass valve is closed, the exhaust gas flows through the respective turbine, which is driven thereby. If the bypass valve is open, the exhaust gas flows through the branch connected in parallel to the turbine, so that the turbine is practically no longer driven.

With known turbocharger systems the bypass valves are in the form of simple valves with only two positions, by which the branches parallel to the turbines can essentially be only opened or closed. With known methods for controlling such a turbocharger system, the bypass valve of the low pressure turbine is closed at low speed or low torque of the internal combustion engine, while the high pressure turbine is controlled by opening or closing the bypass valve, thereby adjusting the charge pressure. At relatively high engine speed or relatively high torque the bypass valve of the high pressure turbine is completely open, while the charge pressure is adjusted by opening or closing the bypass valve of the low pressure turbine. In addition, a third bypass valve (compressor bypass valve) arranged in a branch of the charge air system parallel to the high pressure compressor may be provided. At low speed or low torque of the internal combustion engine, the compressor bypass valve is closed, whereas it is open at relatively high engine speed or relatively high torque.

However, an optimum mode of operation of the turbocharger system is not possible by these means. In particular, an operating mode in which the turbocharger system can be operated with optimum turbine efficiency at various working points of the internal combustion engine is not possible.

The inventors herein have recognized the above issues and provide a solution to at least partly address them. Accordingly, a method is presented for controlling a turbocharger system of an internal combustion engine. The method comprises controlling a first bypass valve of a high pressure exhaust gas turbine and a second bypass valve of a low pressure gas turbine on the basis of a turbine model, the first and second bypass valves continuously variable.

In this way, an improved operating mode of the turbocharger system, in particular an operating mode which is optimized with regard to turbine efficiency, is made possible. For example, there is provided at least one high pressure exhaust gas turbine with a first bypass valve and at least one low pressure exhaust gas turbine with a second bypass valve. In this case the low pressure exhaust gas turbine is arranged, in particular, in the exhaust gas flow downstream of the high pressure exhaust gas turbine. The bypass valves are arranged in a branch of the exhaust system parallel to the respective turbine and make it possible for the exhaust gas flow to bypass the turbine concerned. Each bypass valve may also be in the form of a valve system with a plurality of individual valves.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
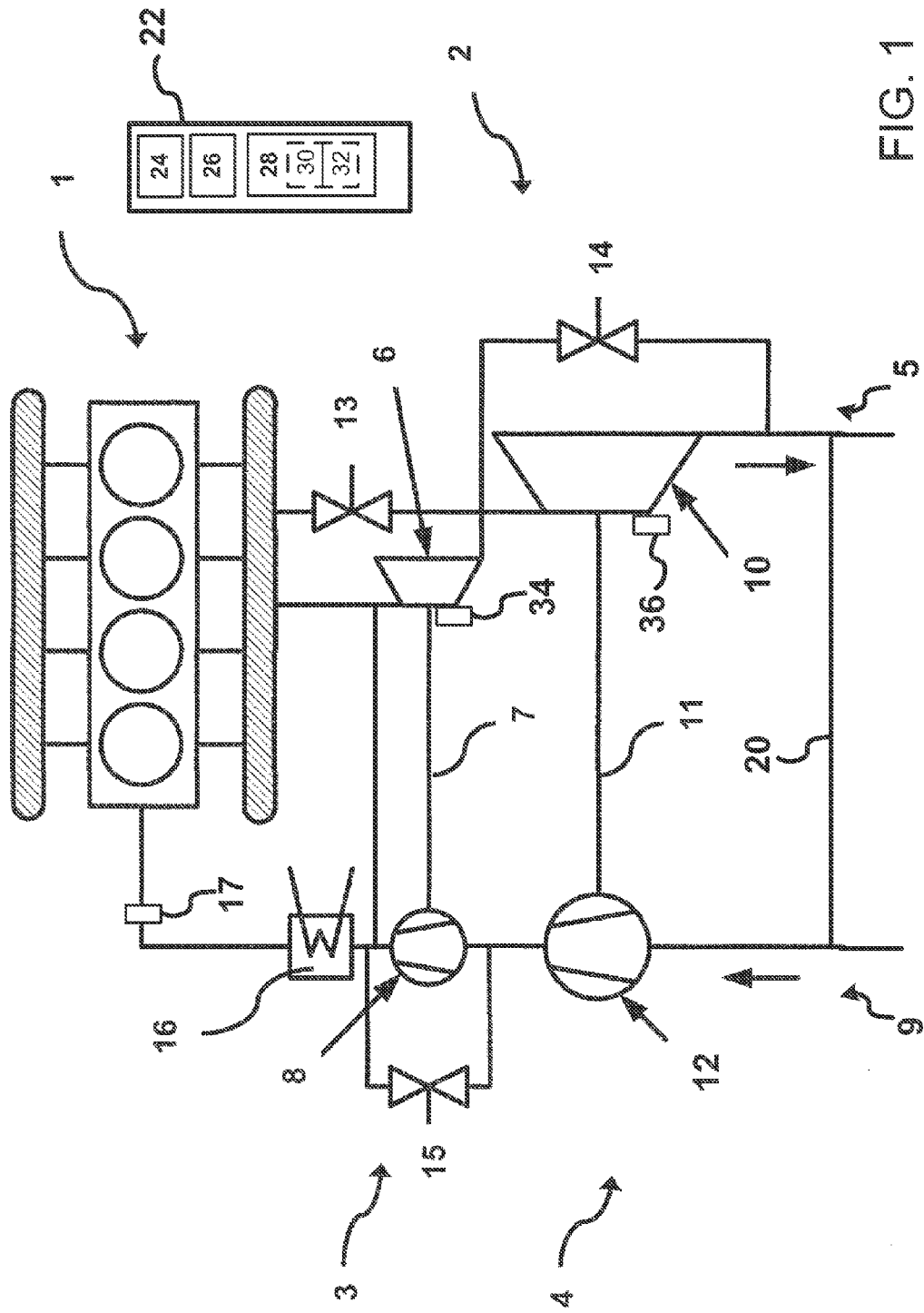
FIG. 1 is a simplified block diagram of an internal combustion engine with a turbocharger system according to an embodiment of the present disclosure.

According to the exemplary embodiment of the disclosure represented in FIG. 1, an internal combustion engine 1, which may be, for example, a spark-ignition or a diesel engine, has a turbocharger system 2 comprising a high pressure turbocharger 3 and a low pressure turbocharger 4. A high pressure turbine 6, which drives a high pressure compressor 8 in the charge air system 9 of the internal combustion engine 1 via a shaft 7, is arranged in the exhaust system 5 of the internal combustion engine 1. A low pressure turbine 10, which drives a low pressure compressor 12 via a shaft 11, is arranged in the exhaust system 5 downstream of the high pressure turbine 6. In the embodiment depicted in FIG. 1, the turbine and compressor of the high pressure turbocharger 3 are dimensioned smaller than the turbine and compressor of the low pressure turbocharger 4. A first bypass valve 13 (also referred to as a turbine valve, TBV) is associated with the high pressure turbine 6, the complete or partial opening of which bypass valve 13 produces a bypass through which the exhaust gas flow bypasses the high pressure turbine 6 completely or partially. The drive of the high pressure turbine 6, and therefore of the high pressure turbocharger 3, can therefore be controlled via the position of the first bypass valve 13. Correspondingly, a second bypass valve 14 (wastegate, WG), by which the low pressure turbocharger 4 can be controlled, is associated with the low pressure turbine 10. The exhaust gas flow therefore passes first through the high pressure turbine 6 or the first bypass valve 13, then through the low pressure turbine 10 or the second bypass valve 14, and is then conducted into further devices of the exhaust system (indicated in FIG. 1 by the arrow pointing downwards), for example into an exhaust gas after-treatment system.

The charge air first flows through the low pressure compressor 12, in the direction of the arrow pointing upwards. The charge air can then flow through the high pressure compressor 8 or bypass the latter via a bypass opened or closed by a third bypass valve 15 (compressor bypass valve, CBV), before being cooled by an intercooler 16 and then supplied to the internal combustion engine 1. The third bypass valve may be actuated passively, in particular by a pressure in the charge air system 9, or may be activated actively. The charge air flow or the charge pressure may be measured by a sensor 17 symbolically represented in FIG. 1. An optionally present exhaust gas recirculation (EGR) system is depicted in FIG. 1. The EGR system diverts a portion of the exhaust gases back to the intake. In one embodiment, the EGR system may include an EGR passage 20 arranged to divert the exhaust after traveling by the high and low pressure turbines and inject it into the intake passage prior to the low pressure compressor. In other embodiments, an EGR passage may be arranged before either the high or low pressure turbines and inject the exhaust into the intake passage after the high and low pressure compressors. However, any suitable EGR arrangement is within the scope of this disclosure.

A control system 22 may activate the turbocharger system. The control system 22 includes, in particular, a processor 24 for determining the positions of the bypass valves according to a turbine model, a memory 26 for storing the turbine model, and a control unit 28 for activating the bypass valves according to the positions determined, the processor 24 being set up to execute the methods described herein. In addition, the control system 22 includes suitable inputs 30 for capturing input variables, such as the rotational speed and the load of the internal combustion engine, the inlet and outlet pressures of the high pressure and the low pressure turbine and/or the rotational speeds of the high pressure and the low pressure turbine. Furthermore, the control system 22 includes outputs 32 for activating the bypass valves of the high pressure and the low pressure turbine, and optionally of a third bypass valve and/or further actuating elements. The control system 22 may be, in particular, a part of an electronic engine management system.

At a given rotational speed of the turbine, the efficiency of an exhaust gas turbine, or the turbine efficiency $\eta$, is dependent in particular on the ratio of the inlet pressure to the outlet pressure, which can be controlled by the position of the bypass valve associated with the respective turbine. However, the pressure ratio at which the maximum value of the turbine efficiency $\eta_{HP}$ of the high pressure exhaust gas turbine 6, or of the turbine efficiency $\eta_{LP}$ of the low pressure exhaust gas turbine, is reached is dependent, inter alia, on the rotational speed of the turbine and is different in the case of the high pressure exhaust gas turbine 6 to that of the low pressure exhaust gas turbine 10, as a rule being higher in the high pressure exhaust gas turbine 6 than in the low pressure exhaust gas turbine 10. Furthermore, the optimum pressure ratio for reaching a maximum turbine efficiency is dependent on the operating parameters of the internal combustion engine 1, in particular on engine speed N and reference torque M.

Figure 2:
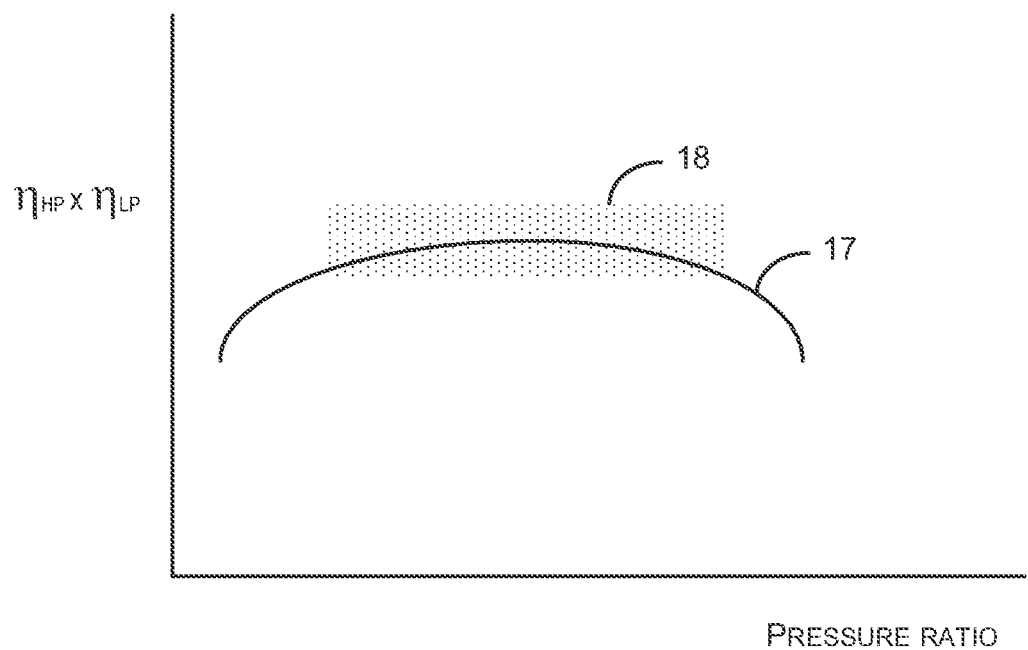
FIG. 2 shows an example graph illustrating turbine efficiency as a function of the pressure ratio.

In FIG. 2 this is represented symbolically for the product of the turbine efficiencies $\eta_{HP} \times \eta_{LP}$. Since the curve 17 represented in FIG. 2 is shallow in the middle region 18, an approximation to an optimum efficiency is possible when adjusting the pressure ratio in this region. Such a curve 17, with an optimum region 18, can be determined for every operating point of the internal combustion engine, which operating point is yielded, in particular, by the rotational speed N and the load or the reference torque M, and can be stored in the context of a calibration within a turbine model. In this case further parameters, such as the rotational speed of the exhaust gas turbines 6, 10, which can be detected by sensors 34, 36, may also be taken into account. The overall pressure ratio between the inlet pressure of the high pressure exhaust gas turbine 6 and the outlet pressure of the low pressure turbine 10 may also be taken into account.

For optimum control of the turbocharger system, reference to the turbine model is made during operation and, as a function of input variables, in particular engine speed N and reference torque M, an optimum point or an optimum range of the pressure ratio, and an adjustment of both bypass valves corresponding thereto, is determined on the basis of a curve corresponding to the representation in FIG. 2.

According to the present disclosure the first and second bypass valves 13, 14 are continuously variable; that is, they are adjustable to constantly selectable intermediate positions between the closed and the open state. The bypass valves 13, 14 may also be adjustable to a multiplicity of discrete intermediate positions, which in the context of the present description is understood also to mean continuously variable.

The portion of the exhaust gas flow used to drive the exhaust gas turbines 6, 10 is adjusted by appropriate activation of the bypass valves 13, 14. In particular, with a bypass valve closed the entire exhaust gas flow can pass through the respective turbine, whereas with a partially open bypass valve a partial flow of the exhaust gas passes through the turbine, and with a fully open bypass valve none or a very small portion of the exhaust gas flow passes through the turbine. The rotational speed of a compressor driven by the exhaust gas turbine concerned, and therefore the charge pressure of the internal combustion engine, can therefore be controlled by the position of the bypass valve.

The control of the first and second bypass valves 13, 14 is affected on the basis of a turbine model. Such a turbine model is a mathematical model of the turbine's behavior which may also include characteristics of the compressors associated with the respective turbines, and optionally further characteristics of the turbocharger system. In particular, such a model makes it possible to assign a value for the adjustment of the bypass valves to each combination of independent input variables. Depending on the degree of detailing of the model, interpolation may also be carried out. The model may also directly supply the corresponding commands for adjusting the bypass valves, which commands take account, for example, of the dependence of volume flow on valve position.

Because the first and second bypass valves 13, 14 are continuously variable, and are controlled on the basis of a turbine model, the turbocharger system can be controlled in accordance with an optimum operating mode at different working points of the internal combustion engine 1.

In particular, the first and second bypass valves 13, 14 may be controlled in such a manner that, at different working points or at each working point of the internal combustion engine 1, the turbine efficiency, or the efficiency of the exhaust gas turbines, is in each case maximized. An especially fuel saving operation of the internal combustion engine 1 and of the turbocharger system 2, as well as an operation which is optimized with regard to response behavior and to exhaust gas and noise emission, is thereby made possible.

Especially advantageously, the bypass valve 13 of the high pressure exhaust gas turbine 6 and the bypass valve 14 of the low pressure exhaust gas turbine 10 may be controlled in such a manner that the product of the turbine efficiencies, or of the efficiencies of the high pressure and low pressure exhaust gas turbines, is maximized for each working point of the internal combustion engine 1. A further optimized operation of the internal combustion engine 1 and of the turbocharger system 2 is thereby achieved.

The turbine model used for controlling the bypass valves may be, in particular, a multidimensional input-output map in which the respective positions of the bypass valves are indicated as a function of the actual working point of the internal combustion engine, which may be determined, for example, by the speed and load or torque of the internal combustion engine. A control of the turbocharger system 2 which in each case is optimized under a large number of possible operating conditions of the internal combustion engine 1 is thereby made possible.

Alternatively or additionally, the turbine model may specify the positions of the bypass valves as a function of the pressure ratio of the exhaust gas turbines, that is the ratio of the inlet pressure to the outlet pressure of the high pressure 6 and/or the low pressure 10 exhaust gas turbine; the overall pressure ratio, that is the ratio of the inlet pressure of the high pressure exhaust gas turbine to the outlet pressure of the low pressure exhaust gas turbine, may also serve as an input variable. Also alternatively or additionally, the turbine model used to control the bypass valves may specify the positions of the bypass valves as a function of the rotational speed of the high pressure and/or of the low pressure exhaust gas turbine. For this purpose a rotational speed sensor of the high pressure or of the low pressure exhaust gas turbine may be provided, the signal of which is used as an input variable. Because operating parameters of the turbocharger system 2 are used for controlling the bypass valves, especially precise control or regulation of the exhaust gas turbines is possible.

According to an embodiment of the present disclosure, one of the bypass valves is controlled as a function of a charge pressure of the internal combustion engine. In particular, the position of the first or the second bypass valve 13, 14 is controlled within a closed control loop in such a manner that a reference value of the charge pressure determined as a function of the operating parameters of the internal combustion engine 1 is obtained, while the respective other of the two bypass valves is not included in the control loop, its position being determined solely on the basis of the turbine model. In this way a high quality of combustion can be achieved at all times by a simple control system, whereby an operating mode of the internal combustion engine 1 is achieved which is especially favorable with regard to fuel consumption and harmful emissions.

Especially preferably, the position of the first bypass valve 13 is controlled as a function of charge pressure at low speed and/or low load of the internal combustion engine, while the second bypass valve 14 is used to control the charge pressure at relatively high speed and/or relatively high load of the internal combustion engine. In particular, which of the bypass valves of the exhaust gas turbines operates in a closed control loop with the charge pressure may depend on a pressure in the charge air flow or on a position of a pressure-actuated valve in the charge air flow, for example of a third bypass valve 15 of a high pressure compressor. Appropriate switching of the control loop to the respective other bypass valve may take place upon overshooting or undershooting of a limit pressure.

The turbocharger system 2 of the internal combustion engine 1 according to the present disclosure comprises at least one high pressure exhaust gas turbine 6 with a first bypass valve 13 and at least one low pressure exhaust gas turbine 10 with a second bypass valve 15 arranged downstream of the high pressure exhaust gas turbine 6 with respect to the exhaust gas flow. The bypass valves 13, 14 are in each case arranged so as to make it possible for the exhaust gas flow to bypass the respective exhaust gas turbine. The high pressure exhaust gas turbine 6 drives, in particular, a high pressure compressor 8 and the low pressure exhaust gas turbine 10 drives a low pressure compressor 12 arranged upstream of the high pressure compressor 8 with respect to the charge air flow. According to the disclosure, the first and second bypass valves 13, 14 are continuously variable, that is, are adjustable to constantly selectable intermediate positions between a closed and an open state. In the context of the present disclosure, the expression "continuously variable" also includes adjustability to a multiplicity of discrete intermediate positions. The bypass valves may be in the form of proportional valves, for example. Furthermore, the bypass valves are preferably adapted with regard to further characteristics, such as response time, accuracy, durability, hysteresis, etc., to the demands of use in the exhaust system.

Because the first and second bypass valves 13, 14 make possible a multiplicity, in particular any desired number, of intermediate positions between a completely open and a completely closed position, not only complete but also partial bypassing of the high pressure and/or low pressure exhaust gas turbine by the exhaust gas flow is possible. For this reason the bypass valves can be activated in such a manner that an optimum operating mode is made possible in each case at different operating points of the internal combustion engine 1 or of the turbocharger system 2. In particular, the bypass valves can be activated to maximize turbine efficiency, or the product of the turbine efficiencies of the high pressure and the low pressure turbine.

According to a preferred embodiment, the turbocharger system 2 includes a third bypass valve 15 which is associated with the high pressure compressor 8. This makes it possible for the charge air flow to bypass the high pressure compressor 8. The third bypass valve 15 may be actively activatable or passive, that is actuatable by the pressure in the charge air system. In particular, the third bypass valve 15 may be configured such that it has only a closed and an open position. The third bypass valve 15 makes possible a further optimized operating mode of the turbocharger system 2, in particular at relatively high rotational speeds or under relatively high load demand.

Preferably, the high pressure and/or the low pressure exhaust gas turbine has a rotational speed sensor. The rotational speed of the exhaust gas turbine concerned can thereby be detected and used for controlling or regulating the turbocharger system 2. Because turbine efficiency reaches its maximum at a pressure ratio of inlet to outlet pressure which is dependent on the rotational speed of the turbine, the rotational speed of the high pressure turbocharger or of the low pressure turbocharger can thereby be controlled in such a manner that turbine efficiency is at a maximum. However, in practice, the maximum efficiency point may not be ideal for the engine torque or emissions and it cannot be guaranteed that the high pressure peak turbine efficiency will occur at exactly the same engine speed and load point as the low pressure peak turbine efficiency. Therefore, the product of the two efficiencies must be used and an overall range employed in order to define the best overall engine operating point.

Furthermore, the internal combustion engine may have an exhaust gas recirculation system. Exhaust gas recirculation is advantageous, inter alia, for reducing harmful emissions. Because the recirculated exhaust gas flow may depend on the back pressure generated by the high pressure and/or the low pressure exhaust gas turbine, the influence of the back pressure may be taken into account, if applicable, in the turbine model used for controlling the bypass valves.

Figure 3:
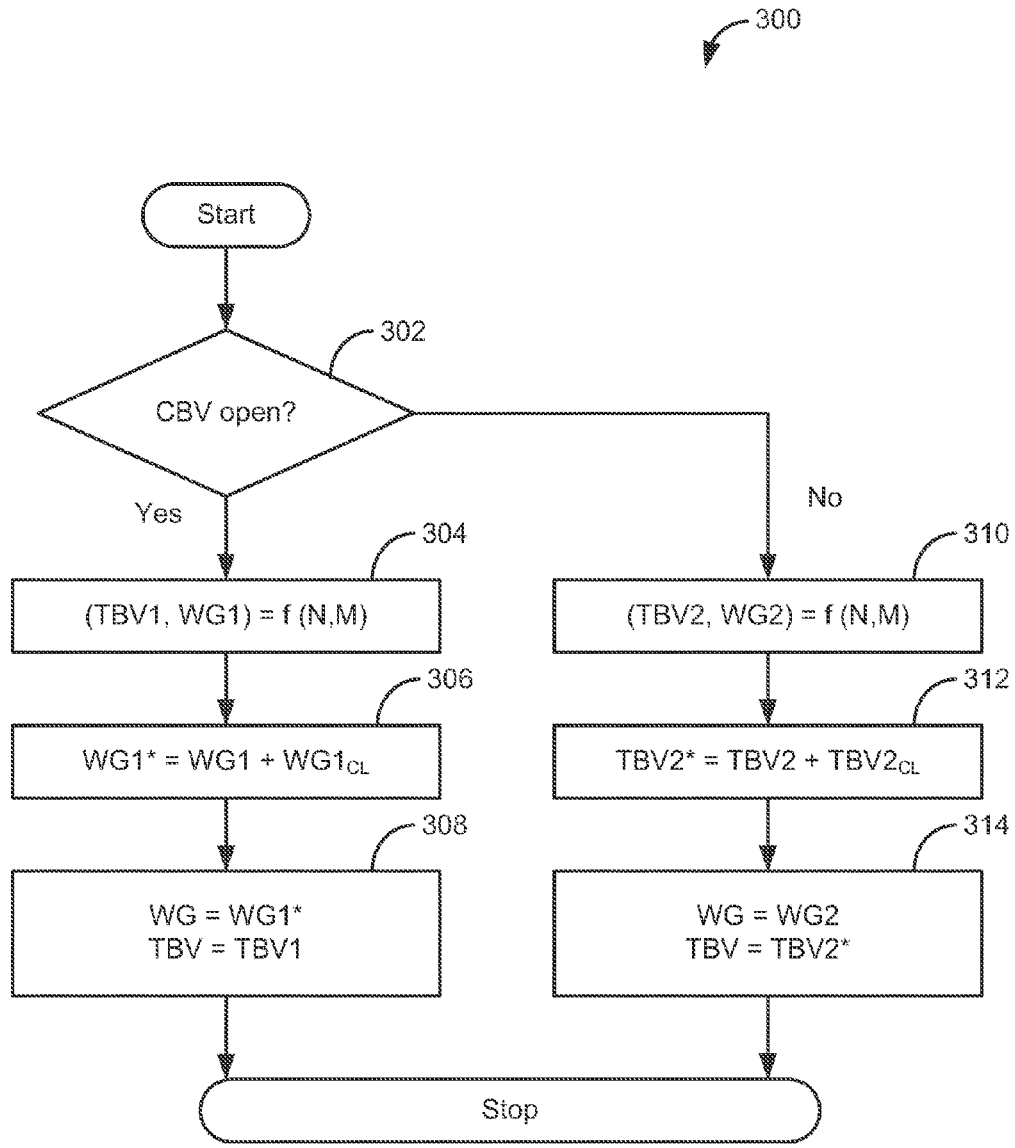
FIG. 3 is a flow diagram showing the sequence of an exemplary embodiment of the method according to the disclosure.

As shown in FIG. 3, an optimization may additionally be effected by controlling the position of one bypass valve in each case in a closed control loop, while including the charge pressure. At 302 of the method 300 represented in FIG. 3, it is determined whether the third bypass valve 15 (CBV) associated with the high pressure compressor 8 is open or closed. This valve may be, for example, pressure-actuated and indicates by its position whether a condition of relatively high rotational speed or relatively high load (CBV open), or a condition of low rotational speed or low load (CBV closed) is present. Depending on the position of the third bypass valve 15 a first or a second branch of the method is run.

In both branches the above-described efficiency-based determination of the position of the first bypass valve (TBV) 13 and of the second bypass valve (WG) 14 as a function of engine speed and load is first carried out at 304 and 310. If the third bypass valve 15 is open (e.g. the answer the question at 302 is Yes), according to a first branch of the method 300 at 306, the second bypass valve 14 associated with the low pressure turbine 10 is used to control the charge pressure, in that a correction value $WG1_{CL}$ (closed loop) is added to the value WG1 determined in 304, on the basis of a value of the charge pressure set-point error determined by the sensor 17 (e.g., the difference between the desired, set-point charge pressure and the measured charge pressure). Next, at 308, the second bypass valve 14 is activated according to the value WG1* determined likewise. The first bypass valve 13 is activated according to the previously determined value TBV1.

In the second branch of the method 300, which is run in the case of the closed position of the third bypass valve 15 (CBV) determined at 302, the first bypass valve 13 is used in a corresponding manner for the charge pressure control loop, in that the value TBV2 determined in 310 is corrected by a correction value $TBV2_{CL}$ determined on the basis of the charge pressure set-point error at 312, before the first and second bypass valves 13, 14 are activated accordingly at 314. The method is then ended or repeated.

That is, the first and second bypass valves (TBV and WG) may have a set position that is determined as a function of engine speed and load, for example. Then, under a first condition when engine speed and load are relatively high, the third bypass valve (CBV) may be open, and the position of the second bypass valve may be adjusted in order to maintain charge pressure at a desired level. Further, the second bypass valve position may be adjusted so that engine load is maintained. The first bypass valve may be maintained at the original set position. Under a second condition when engine speed and load are low, the third bypass valve may be closed and the position of the first bypass valve may be adjusted to maintain charge pressure and engine load at desired levels, while maintaining the second bypass valve at the original set position.

Further, in some embodiments the switch point at 302 may be a function of speed and load, which would lead to a different reparation of the closed loop terms $WG1_{CL}$ and $TBV2_{CL}$.

In this way, under certain conditions, adjustments to the turbocharger system to achieve a desired level of charge pressure may be made by adjusting the position of the first bypass valve, while under other conditions, the desired level of charge pressure may be maintained by adjusting the second bypass valve. Therefore, the desired charge pressure may be maintained while operating the turbines at a high level of efficiency across various operating conditions of the engine.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a turbocharger system of an internal combustion engine, comprising:

controlling a first bypass valve of a high pressure exhaust gas turbine and a second bypass valve of a low pressure gas turbine based on a turbine model, the model determining set positions of the first and second bypass valves, and the first and second bypass valves continuously variable; and adjusting one of the first or second bypass valve while maintaining the set position of the other of the first or second bypass valve to maintain charge pressure and engine load.

2. The method as claimed in claim 1, wherein the first and second bypass valves are controlled in such a manner that turbine efficiency is at a maximum.

3. The method as claimed in claim 2, wherein a product of turbine efficiencies of the high pressure ($\eta_{HP}$) and of the low pressure exhaust gas turbine ($\eta_{LP}$) is at a maximum.

4. The method as claimed claim 1, wherein the first and second bypass valves are controlled as a function of a working point of the internal combustion engine, of a ratio of an inlet pressure to an outlet pressure of the high pressure and/or of the low pressure exhaust gas turbine, and/or of a rotational speed of the high pressure and/or of the low pressure exhaust gas turbine.

5. The method as claimed in claim 1, wherein the first or the second bypass valve is adjusted as a function of a charge pressure of the internal combustion engine.

6. The method as claimed in claim 5, wherein the first bypass valve is adjusted as a function of the charge pressure at low speed and/or low load of the internal combustion engine, and the second bypass valve is adjusted as a function of the charge pressure at relatively high speed and/or relatively high load of the internal combustion engine.

7. A turbocharger method, comprising:
   determining respective set positions of a first bypass valve of a high pressure turbine and a second bypass valve of a low pressure turbine;
   determining a set-point error comprising a difference between a desired set-point charge pressure and a measured charge pressure;
   under a first condition, maintaining the first bypass valve at the set position for the first bypass valve and adjusting a position of the second bypass valve away from the set position according to the set-point error to maintain charge pressure and engine load; and
   under a second condition, maintaining the second bypass valve at the set position for the second bypass valve and adjusting a position of the first bypass valve away from the set position according to the set-point error to maintain charge pressure and engine load.

8. The method of claim 7, wherein the first condition comprises a third bypass valve of a high pressure compressor being open, and wherein the second condition comprises the third bypass valve being closed.

9. The method of claim 8, wherein the third bypass valve is open during high speed and high load conditions and is closed during low speed and low load conditions.

10. The method of claim 8, wherein the third bypass valve is passively controlled based on charge pressure.

11. The method of claim 7, wherein the set positions of the first and second bypass valves are determined as a function of engine speed and load.

12. A turbocharger system of an internal combustion engine, comprising:
   at least one high pressure exhaust gas turbine with a continuously variable position first bypass valve;
   at least one low pressure exhaust gas turbine with a continuously variable position second bypass valve, the low pressure exhaust gas turbine connected downstream of the high pressure exhaust gas turbine in an exhaust gas flow, the high pressure exhaust gas turbine driving a high pressure compressor and the low pressure exhaust gas turbine driving a low pressure compressor connected upstream of the high pressure compressor in a charge air flow; and
   a control system including a processor storing a non-transitory computer readable code executable to control a set position of the first and second bypass valve and adjust one of the first or second bypass valve while maintaining the set position of the other of the first or second bypass valve to maintain charge pressure and engine load.

13. The turbocharger system as claimed in claim 12, wherein the high pressure compressor has a third bypass valve.

14. The turbocharger system as claimed in claim 13, wherein the third bypass valve is controlled as a function of charge pressure.

15. The turbocharger system as claimed in claim 12, wherein the high pressure and/or the low pressure exhaust gas turbine have a rotational speed sensor.

16. The turbocharger system as claimed in claim 12, wherein the internal combustion engine has an exhaust gas recirculation system.

17. The turbocharger system as claimed in claim 12, wherein the control system controls the set position of the first and second bypass valves as a function of one or more of engine speed, engine load, pressure ratio across the high pressure and/or low pressure turbine, and rotation speed of the high pressure and/or low pressure turbine.

18. The turbocharger system as claimed in claim 17, wherein the control system adjusts the first bypass valve as a function of charge pressure at low speed and/or low load of the internal combustion engine, and adjusts the second bypass valve as a function of charge pressure at relatively high speed and/or relatively high load of the internal combustion engine.

* * * * *